(12) United States Patent
Ling

(10) Patent No.: US 6,731,498 B1
(45) Date of Patent: May 4, 2004

(54) FIXING DEVICE FOR OPTICAL PROTECTION LENS OF LIQUID CRYSTAL DISPLAY MONITOR

(76) Inventor: Yi Tzu Ling, No. 647, Dadian Rd., Hemei Jen, Changhua (TW), 508

( * ) Notice: Subject to any disclaimer, the term of this patent is extended or adjusted under 35 U.S.C. 154(b) by 0 days.

(21) Appl. No.: 10/358,242

(22) Filed: Feb. 5, 2003

(51) Int. Cl.[7] .............................. H05K 5/03; H04N 5/72
(52) U.S. Cl. ...................... 361/681; 359/601; 348/834; 348/818
(58) Field of Search ................... 361/681; 359/601, 359/603, 604, 608, 609; 348/818, 832, 834, 835, 823

(56) References Cited

U.S. PATENT DOCUMENTS

| | | | | |
|---|---|---|---|---|
| 5,155,627 A | * | 10/1992 | Keehn et al. ............... | 359/609 |
| D338,194 S | * | 8/1993 | Hartwig ..................... | D14/450 |
| 5,803,424 A | * | 9/1998 | Keehn et al. ............... | 248/489 |
| 6,050,833 A | * | 4/2000 | Danzyger et al. .............. | 439/92 |
| 6,125,525 A | * | 10/2000 | Brock ...................... | 29/525.01 |

FOREIGN PATENT DOCUMENTS

EP     506346 A2 * 9/1992 ............. H04N/5/64

\* cited by examiner

*Primary Examiner*—Dean A. Reichard
*Assistant Examiner*—Carmelo Oliva

(57) ABSTRACT

A fixing device includes a pressing block, and a bonding block pivotally mounted on the pressing block. The optical protection lens is closely sandwiched between the pressing block and the bonding block rigidly and stably. Thus, the optical protection lens can be mounted on and detached from the liquid crystal display monitor easily and conveniently by design of the fixing device, thereby facilitating the user assembling and disassembling the optical protection lens. In addition, the optical protection lens is closely rested on the liquid crystal display monitor, thereby protecting the user's eyes efficiently.

11 Claims, 5 Drawing Sheets

FIXING DEVICE FOR OPTICAL PROTECTION LENS OF LIQUID CRYSTAL DISPLAY MONITOR

BACKGROUND OF THE INVENTION

1. Field of the Invention

The present invention relates to a fixing device for an optical protection lens of a liquid crystal display monitor, and more particularly to a fixing device for an optical protection lens of a liquid crystal display monitor, wherein the optical protection lens can be mounted on and detached from the liquid crystal display monitor easily and conveniently by design of the fixing device, thereby facilitating the user assembling and disassembling the optical protection lens.

2. Description of the Related Art

The liquid crystal display (LCD) monitor is largely used in the computer to reduce the radiation effect, so as to protect the user's eyes. In addition, the LCD monitor has a very small thickness, thereby saving space. However, the conventional optical protection lens cannot be mounted on the LCD monitor due to the extremely small thickness of the LCD monitor, so that the conventional optical protection lens is not available for the LCD monitor.

SUMMARY OF THE INVENTION

The primary objective of the present invention is to provide a fixing device having a simplified construction, thereby greatly decreasing costs of fabrication.

Another objective of the present invention is to provide a fixing device, wherein the optical protection lens is closely rested on the liquid crystal display monitor, thereby protecting the user's eyes efficiently.

A further objective of the present invention is to provide a fixing device for an optical protection lens of a liquid crystal display monitor, wherein the optical protection lens can be mounted on and detached from the liquid crystal display monitor easily and conveniently by design of the fixing device, thereby facilitating the user assembling and disassembling the optical protection lens.

A further objective of the present invention is to provide a fixing device for an optical protection lens of a liquid crystal display monitor, wherein the optical protection lens is closely sandwiched between the pressing block and the bonding block rigidly and stably.

In accordance with the present invention, there is provided a fixing device, comprising a pressing block, and a bonding block, wherein:

the pressing block has two opposite ends each formed with a pivot slot, the pressing block has a side face formed with a recessed stepped edge formed with two protruding combination posts; and the bonding block is pivotally mounted on the pressing block, and has two opposite ends each provided with a semi-circular pivot ear pivotally mounted in the respective pivot slot of the pressing block, the bonding block has a side face rested on the stepped edge of the pressing block and formed with two protruding pads each urged on a respective one of the two combination posts of the pressing block.

Further benefits and advantages of the present invention will become apparent after a careful reading of the detailed description with appropriate reference to the accompanying drawings.

DETAILED DESCRIPTION OF THE INVENTION

Figure 1:
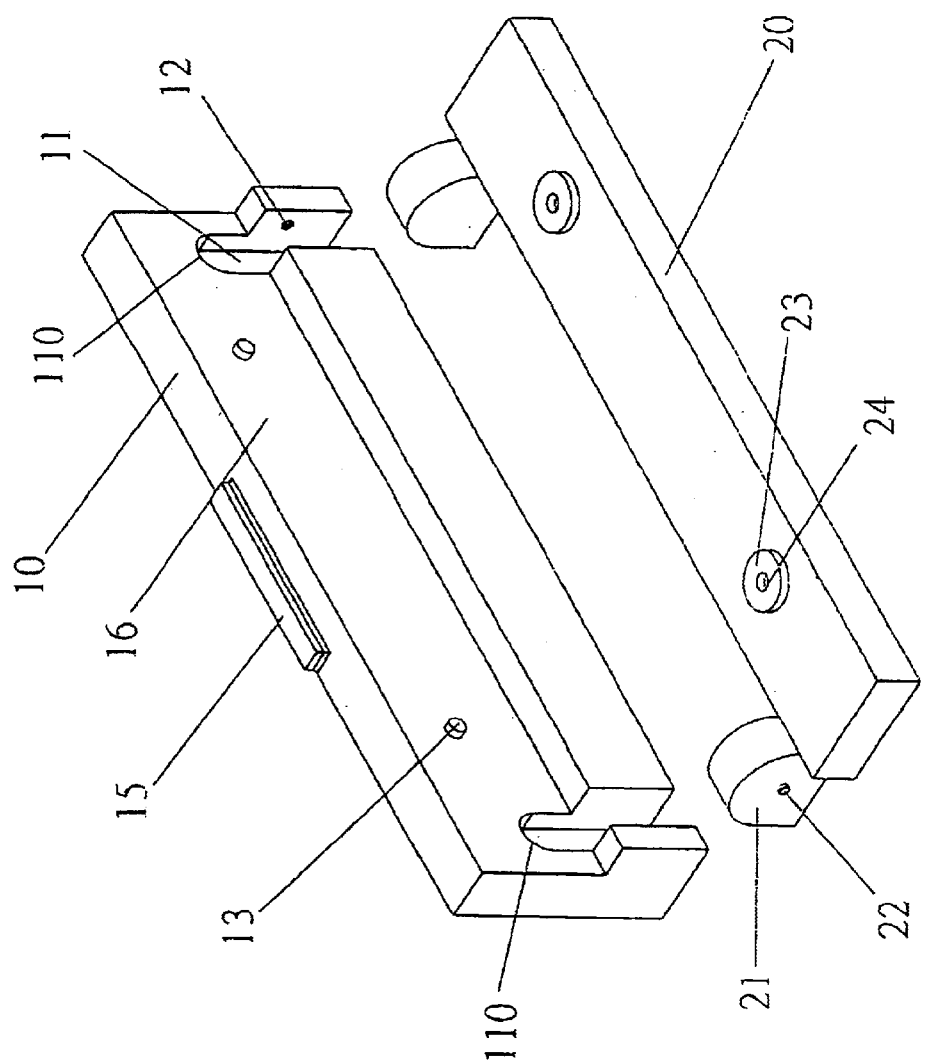
FIG. 1 is an exploded perspective view of a fixing device in accordance with the preferred embodiment of the present invention.
Figure 2:
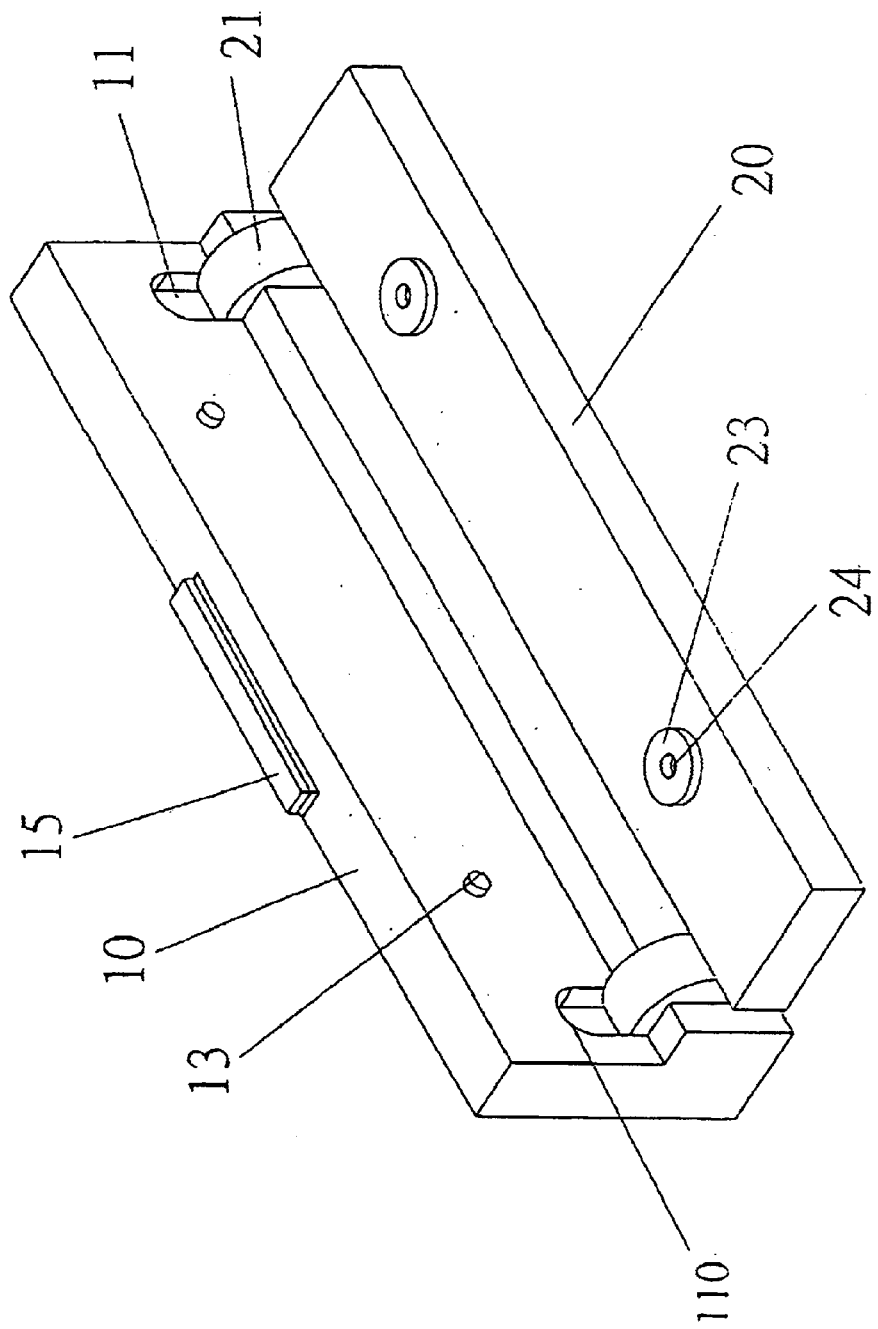
FIG. 2 is a perspective assembly view of the fixing device in accordance with the preferred embodiment of the present invention.
Figure 3:
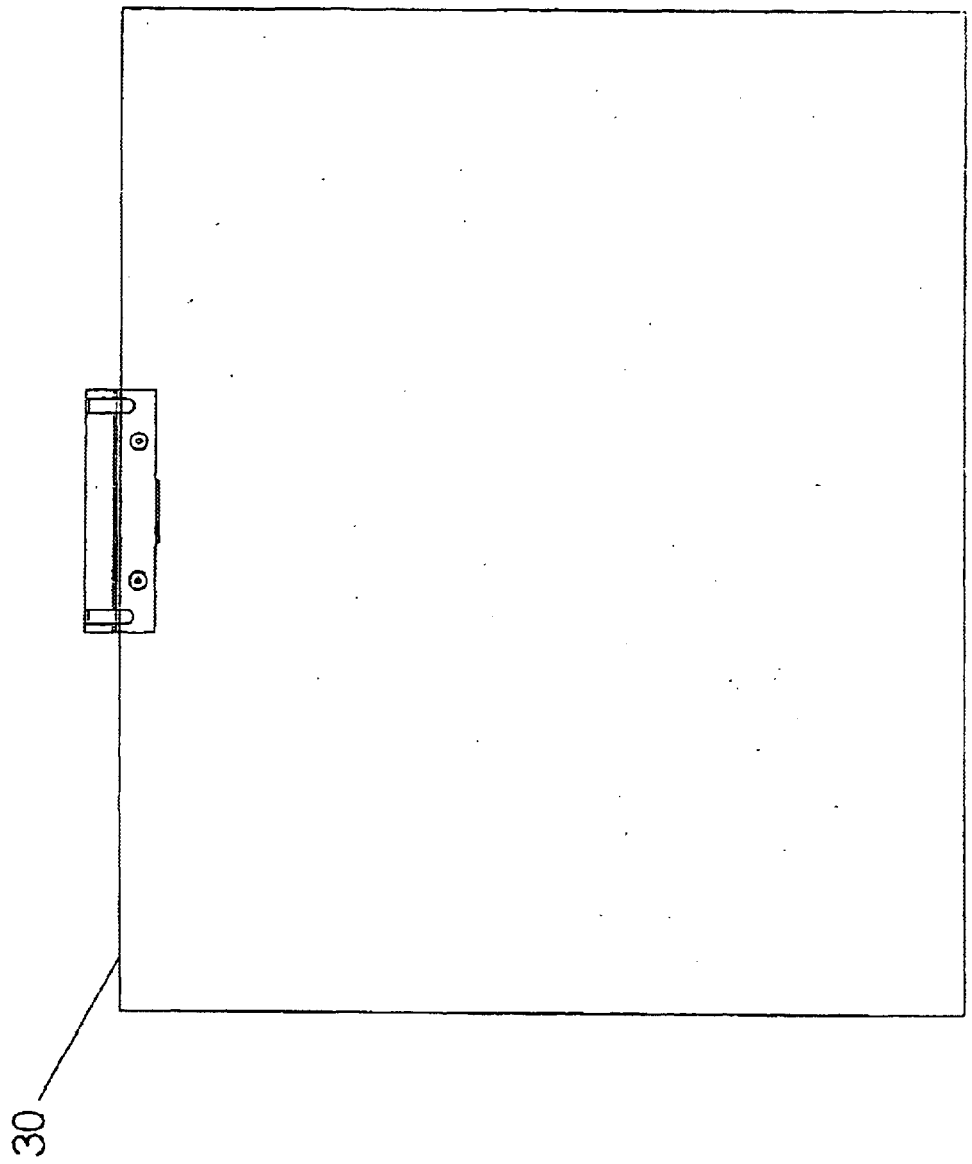
FIG. 3 is a front plan view showing a combination of the fixing device and the optical protection lens in accordance with the preferred embodiment of the present invention.
Figure 4:
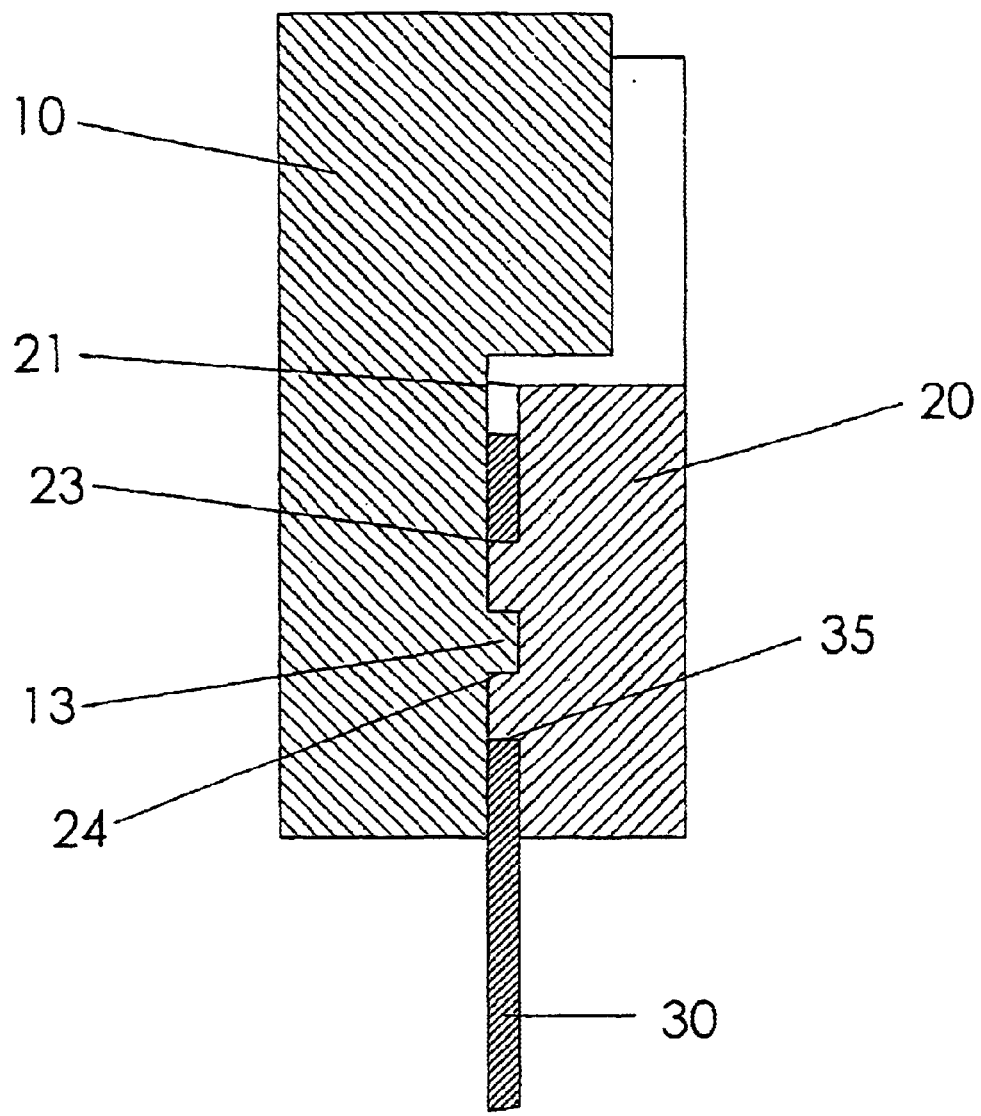
FIG. 4 is a partially cut-away side plan cross-sectional view of the combination of the fixing device and the optical protection lens fixing device as shown in FIG. 3.

Referring to the drawings and initially to FIGS. 1–3, a fixing device for an optical protection lens of a liquid crystal display monitor in accordance with the preferred embodiment of the present invention comprises a pressing block 10, and a bonding block 20.

The pressing block 10 is a flat-shaped plate. The pressing block 10 has two opposite ends each formed with a pivot slot 11. The pivot slot 11 of the pressing block 10 has a side wall formed with a circular pivot hole 12. The pivot holes 12 of the two opposite ends of the pressing block 10 are located at the same axis. The pivot slot 11 of the pressing block 10 has a top wall formed with a semi-circular resting edge 110. The pressing block 10 has a side face formed with a recessed stepped edge 16 formed with two protruding combination posts 13. The pressing block 10 has a top portion formed with a drive plate 15.

The bonding block 20 is pivotally mounted on the pressing block 10. The bonding block 20 is a flat-shaped plate. The bonding block 20 has two opposite ends each provided with a semi-circular pivot ear 21 pivotally mounted in the respective pivot slot 11 of the pressing block 10. The pivot ear 21 of each of the two opposite ends of the bonding block 20 has a side wall formed with a protruding circular pivot shaft 22 pivotally mounted in the respective pivot hole 12 of the pressing block 10. The bonding block 20 has a first side face rested on the stepped edge 16 of the pressing block 10 and formed with two protruding pads 23 each urged on a respective one of the two combination posts 13 of the pressing block 10. The bonding block 20 has a second side face provided with a releasing paper (not shown). Each of the two pads 23 of the bonding block 20 is formed with an insertion hole 24 for insertion of the respective combination post 13 of the pressing block 10.

Figure 5:
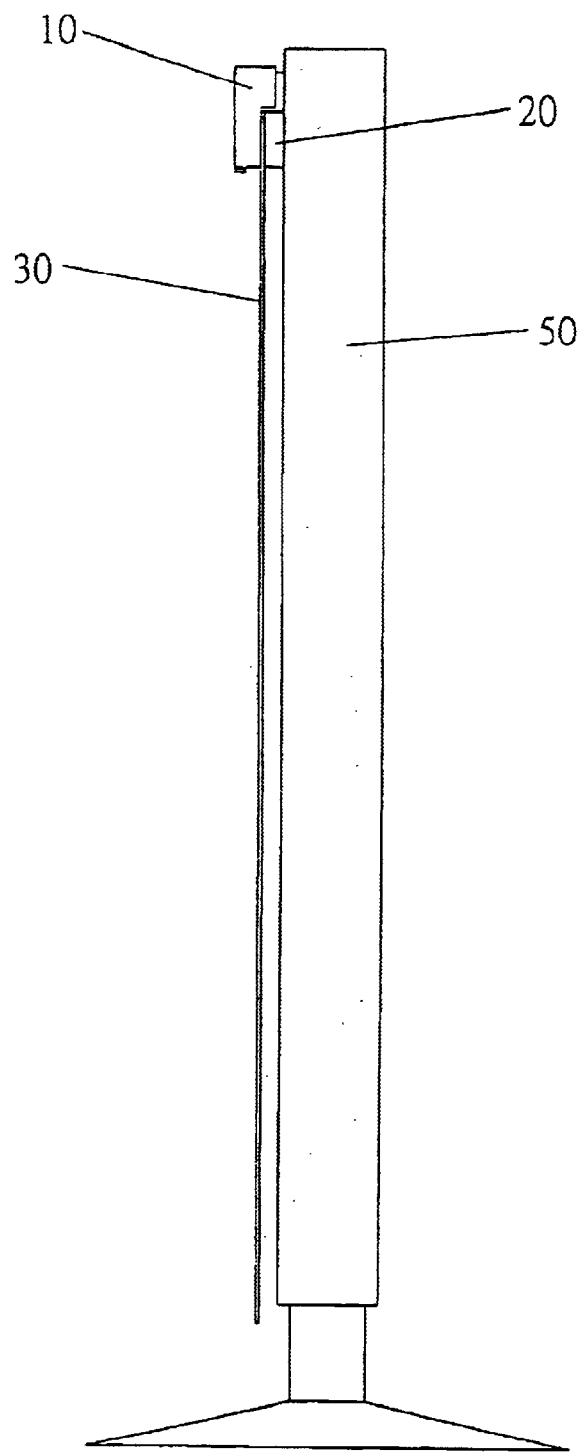
FIG. 5 is a side plan view showing a combination of the fixing device, the optical protection lens and the liquid crystal display monitor.

In assembly, referring to FIGS. 1–5, the pivot ear 21 of the bonding block 20 is pivotally mounted in the respective pivot slot 11 of the pressing block 10, and the pivot shaft 22 of the bonding block 20 is pivotally mounted in the respective pivot hole 12 of the pressing block 10, so that the bonding block 20 is pivotally mounted on the pressing block 10. Then, the optical protection lens 30 is mounted on the bonding block 20, with each of the two pads 23 of the bonding block 20 being inserted into a respective suspension hole 35 of the optical protection lens 30. It is appreciated that, each of the two pads 23 of the bonding block 20 has a height substantially equal to a thickness of the optical protection lens 30. Then, the pressing block 10 is pivoted relative to the bonding block 20 to cover the optical protection lens 30, with the drive plate 15 of the pressing block 10 being rested on the top portion of the bonding block 20 and with each of the combination posts 13 of the pressing block 10 being inserted into the insertion hole 24 of the respective pad 23 of the bonding block 20, so that the pressing block 10 is combined with the bonding block 20, and the optical protection lens 30 is closely sandwiched between the pressing block 10 and the bonding block 20 rigidly and stably. Then, the releasing paper of the bonding block 20 is stripped, so that the bonding block 20 can be bonded on the liquid crystal display monitor 50, thereby hanging the optical protection lens 30 on the liquid crystal display monitor 50 as shown in FIG. 5.

Alternatively, the user can exert a force on the drive plate 15 of the pressing block 10 so as to detach the drive plate 15 of the pressing block 10 from the top portion of the bonding block 20, so that the optical protection lens 30 can be directly detached from the bonding block 20 easily and conveniently, thereby facilitating the user assembling and disassembling the optical protection lens 30.

Accordingly, the optical protection lens 30 can be mounted on and detached from the liquid crystal display monitor 50 easily and conveniently by design of the fixing device, thereby facilitating the user assembling and disassembling the optical protection lens 30. In addition, the fixing device has a simplified construction, thereby greatly decreasing costs of fabrication. Further, the optical protection lens 30 is closely rested on the liquid crystal display monitor 50, thereby protecting the user's eyes efficiently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A fixing device, comprising a pressing block, and a bonding block, wherein:

the pressing block has two opposite ends each formed with a pivot slot, the pressing block has a side face formed with a recessed stepped edge formed with two protruding combination posts; and the bonding block is pivotally mounted on the pressing block, and has two opposite ends each provided with a semi-circular pivot ear pivotally mounted in the respective pivot slot of the pressing block, the bonding block has a side face rested on the stepped edge of the pressing block and formed with two protruding pads each urged on a respective one of the two combination posts of the pressing block.

2. The fixing device in accordance with claim 1, wherein the pressing block is a flat-shaped plate.

3. The fixing device in accordance with claim 1, wherein the pivot slot of the pressing block has a side wall formed with a circular pivot hole, and the pivot ear of each of the two opposite ends of the bonding block has a side wall formed with a protruding circular pivot shaft pivotally mounted in the respective pivot hole of the pressing block.

4. The fixing device in accordance with claim 3, wherein the pivot holes of the two opposite ends of the pressing block are located at the same axis.

5. The fixing device in accordance with claim 1, wherein the pivot slot of the pressing block has a top wall formed with a semi-circular resting edge.

6. The fixing device in accordance with claim 1, wherein the pressing block has a top portion formed with a drive plate.

7. The fixing device in accordance with claim 1, wherein the bonding block is a flat-shaped plate.

8. The fixing device in accordance with claim 1, wherein each of the two pads of the bonding block is formed with an insertion hole for insertion of the respective combination post of the pressing block.

9. The fixing device in accordance with claim 1, further comprising an optical protection lens mounted on the bonding block and pressed by the pressing block.

10. The fixing device in accordance with claim 9, wherein each of the two pads of the bonding block is inserted into a respective suspension hole of the optical protection lens.

11. The fixing device in accordance with claim 10, wherein each of the two pads of the bonding block has a height substantially equal to a thickness of the optical protection lens.

* * * * *